United States Patent
Lechner et al.

(10) Patent No.: US 12,054,146 B2
(45) Date of Patent: Aug. 6, 2024

(54) LONGITUDINAL DRIVER ASSISTANCE SYSTEM IN A MOTOR VEHICLE

(71) Applicant: Bayerische Motoren Werke Aktiengesellschaft, Munich (DE)

(72) Inventors: Andreas Lechner, Munich (DE); Miguel Loenne, Munich (DE); Sebastien Mathieu, Fuerstenfeldbruck (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 123 days.

(21) Appl. No.: 17/253,945

(22) PCT Filed: May 28, 2019

(86) PCT No.: PCT/EP2019/063860
§ 371 (c)(1),
(2) Date: Dec. 18, 2020

(87) PCT Pub. No.: WO2020/001902
PCT Pub. Date: Jan. 2, 2020

(65) Prior Publication Data
US 2021/0261127 A1    Aug. 26, 2021

(30) Foreign Application Priority Data
Jun. 28, 2018  (DE) ............. 10 2018 210 650.9

(51) Int. Cl.
*B60W 30/14* (2006.01)
*B60K 31/00* (2006.01)

(52) U.S. Cl.
CPC ....... *B60W 30/143* (2013.01); *B60K 31/0066* (2013.01); *B60W 2552/05* (2020.02); *B60W 2552/15* (2020.02); *B60W 2552/30* (2020.02)

(58) Field of Classification Search
None
See application file for complete search history.

(56) References Cited

U.S. PATENT DOCUMENTS

2010/0292904 A1* 11/2010 Taguchi ............ B60W 50/0097
701/93
2017/0015319 A1   1/2017 Knoller
(Continued)

FOREIGN PATENT DOCUMENTS

CN    106347376 A    1/2017
CN    107810132 A    3/2018
(Continued)

OTHER PUBLICATIONS

International Search Report (PCT/ISA/210) issued in PCT Application No. PCT/EP2019/063860 dated Oct. 9, 2019 with English translation (four (4) pages).
(Continued)

*Primary Examiner* — David P. Merlino
(74) *Attorney, Agent, or Firm* — Crowell & Moring LLP

(57) ABSTRACT

A longitudinal driver assistance system is provided in a motor vehicle. A first detection system identifies a first event which, starting from an actual speed, leads to the specification of an increased target speed at a predefined location-dependent first moment in time, and for identifying a subsequent second event which, starting from the increased target speed, leads to the specification of a target speed that is reduced in relation thereto at a predefined location-dependent second moment in time. A second detection system identifies, in an anticipatory manner, a predefined deceleration potential starting from the increased target speed to the reduced target speed. A functional unit reduces the acceleration to the increased target speed if, otherwise, the subsequent deceleration to the reduced target speed with (Continued)

the predefined deceleration potential cannot be completed at the location-dependent moment in time of the second event.

19 Claims, 5 Drawing Sheets

(56) References Cited

U.S. PATENT DOCUMENTS

| | | | |
|---|---|---|---|
| 2017/0015320 A1 | 1/2017 | Knoller et al. | |
| 2017/0072926 A1* | 3/2017 | Fukuda | B60W 10/04 |
| 2017/0261991 A1* | 9/2017 | Raghu | B60W 30/00 |
| 2018/0134294 A1 | 5/2018 | Knoller | |
| 2020/0361476 A1* | 11/2020 | Gaither | B60W 30/18072 |
| 2020/0391764 A1* | 12/2020 | Gotou | B60W 30/143 |

FOREIGN PATENT DOCUMENTS

| | | |
|---|---|---|
| DE | 10 2012 211 967 A1 | 1/2014 |
| DE | 10 2014 215 673 A1 | 2/2016 |
| DE | 10 2015 213 190 B3 | 9/2016 |
| DE | 10 2015 213 181 B3 | 1/2017 |
| DE | 10 2015 213 182 B3 | 1/2017 |
| DE | 10 2015 213 189 A1 | 1/2017 |
| WO | WO-2015178839 A1 * | 11/2015 ............. B60K 31/00 |

OTHER PUBLICATIONS

German-language Written Opinion (PCT/ISA/237) issued in PCT Application No. PCT/EP2019/063860 dated Oct. 9, 2019 (six (6) pages).
German-language Search Report issued in German Application No. 10 2018 210 650.9 dated Feb. 28, 2019 with partial English translation (12 pages).
German-language Search Report issued in German Application No. 10 2018 210 648.7 dated Feb. 28, 2019 with partial English translation (12 pages).
German-language Search Report issued in German Application No. 10 2018 210 649.5 dated Feb. 28, 2019 with partial English translation (12 pages).
Chinese-language Office Action issued in Chinese Application No. 201980043143.1 dated Apr. 20, 2023 with English translation (13 pages).

* cited by examiner

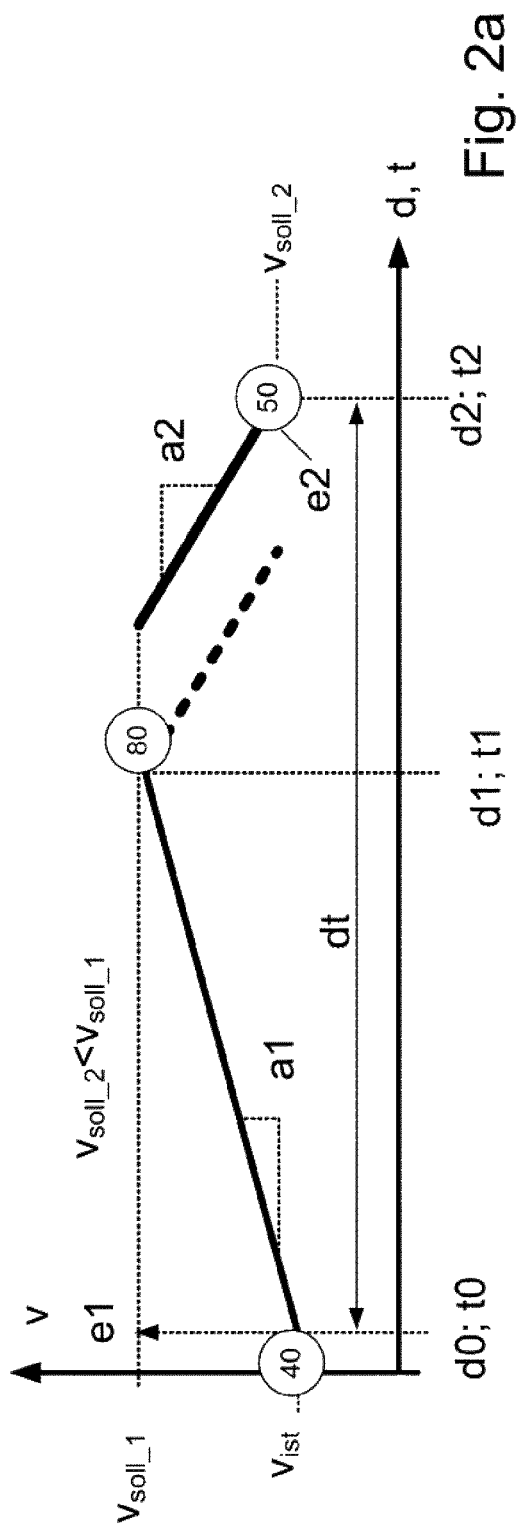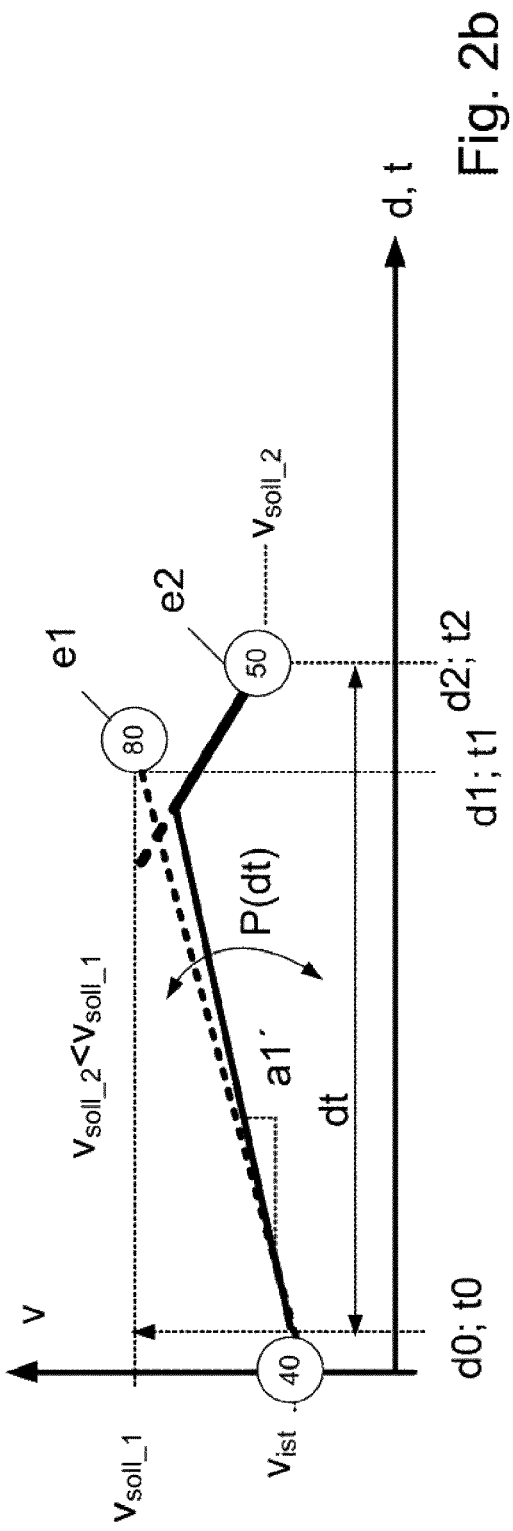

LONGITUDINAL DRIVER ASSISTANCE SYSTEM IN A MOTOR VEHICLE

BACKGROUND AND SUMMARY OF THE INVENTION

The invention relates to a longitudinal driver assistance system in the automated longitudinal guidance mode (for example, with activated cruise control) in a motor vehicle.

In principle, many longitudinal driver assistance systems designed as cruise control systems are already known, which control the speed of the motor vehicle to a predefined setpoint and/or maximum permissible top speed. In addition to these longitudinal control systems, longitudinal control systems expanded to include distance control, so-called adaptive longitudinal control systems or cruise control systems, can also already be acquired nowadays from some manufacturers. Such systems (for example, BMW "Active Cruise Control" (ACC)) make it possible to automatically guide the motor vehicle while maintaining a desired distance to a preceding vehicle at a desired speed or an appropriately lower speed. If a distance sensor system mounted at the motor vehicle, which can operate, in particular, on the basis of radar, detects a preceding target object or (motor) vehicle in the host lane, the own speed is adapted with the aid of a deceleration intervention of the drive motor and/or of wheel brake system to the speed of the preceding motor vehicle or of the target object in such a way that a distance control contained in the "active cruise control" or in the appropriate longitudinal control system automatically adjusts and maintains a distance to the preceding motor vehicle or target object that is appropriate to the situation.

DE 10 2012 211 967 A1 describes a combination of a speed limiting system and a cruise control system, wherein the maximum permissible top speed of the speed limiting system, in place of the selected set speed, is acquirable as the (new) setpoint or target speed for the cruise control.

Finally, a driver assistance system is known, for example, from DE 10 2015 213 181 B3, which can identify, in an anticipatory manner, a speed limit either from map data of a navigation system and/or with the aid of image processing and continuously display these to the driver upon attainment of the speed limit, and so the driver can automatically adapt his/her speed, as necessary, to the speed limit (for example, BMW Speed Limit Assist or BMW Efficient Dynamic Pilot).

The longitudinal driver assistance system for a motor vehicle known from DE 10 2015 213 181 B3 essentially comprises a detection system for identifying presently applicable or upcoming relevant events that require a change of the maximum permissible top speed, a second detection system, which can be part of the first detection system or also identical thereto, for identifying the route to be traveled, and a functional unit which, upon identification of a relevant, presently applicable or upcoming event, ascertains a location-dependent point in time under consideration of the location of the relevant event (and, possibly, further necessary information, such as an ascertained maximum permissible speed at the location of the relevant event, the differential speed between the vehicle and the ascertained new maximum permissible speed, identified free driving or succession driving, present or permitted deceleration modes of the vehicle, such as sailing operation, coasting operation, braking operation), upon the attainment of which the functional unit triggers an automatic adaptation of the presently maximum permissible top speed or an output of a prompt message for permitting an automatic adaptation of the presently maximum permissible top speed to a new maximum permissible top speed. If an upcoming event is identified in a timely manner, a deceleration strategy of the vehicle for reaching the ascertained maximum permissible top speed is ideally ascertained at the location (or at least close thereto) of the relevant event. On the basis of the ascertained deceleration strategy, the location-dependent point in time to be ascertained then results, at which the automatic adaptation of the presently maximum permissible top speed or the output of a prompt message for permitting an automatic adaptation of the presently maximum permissible top speed to a new maximum permissible top speed is initiated.

The problem addressed by the invention is that of improving a longitudinal driver assistance system in terms of comfort and utilization with respect to an adaptation of the speed to a changed setpoint speed.

This problem is solved by a driver assistance system according to the independent claim. Advantageous developments result from the dependent claims.

The invention relates to a longitudinal driver assistance system in a motor vehicle, including:
  a first detection system for identifying a first event which, starting from an actual speed, results in the specification of an increased setpoint speed at a predefined location-dependent first point in time, and for identifying a subsequent second event which, starting from the increased setpoint speed, results in the specification of a setpoint speed that is reduced in relation thereto at a predefined location-dependent second point in time;
  a second detection system for identifying, in an anticipatory manner, a predefined deceleration potential starting from the increased setpoint speed to the reduced setpoint speed; and
  a functional unit, which reduces the acceleration to the increased setpoint speed if, otherwise, the subsequent deceleration to the reduced setpoint speed with the predefined deceleration potential cannot be completed at the location-dependent point in time of the second event.

Preferably, the functional unit is configured for reducing the acceleration to the increased setpoint speed on the basis of an empirically ascertained, tabular specification depending on a predefined, location-based time interval to the second event.

In one further advantageous embodiment of the invention, the increased setpoint speed is a set speed predefined by the driver and the specification of the set speed is the first event.

In one further advantageous embodiment of the invention, the reduced setpoint speed is a maximum permissible top speed and the specification of the top speed is the second event.

In one further advantageous embodiment of the invention, the second event is a maximum permissible top speed for merging into a roundabout, for exiting an exit ramp, and/or for negotiating at least one curve having a previously determined curve radius.

In one further advantageous embodiment of the invention, the reduced setpoint speed is a virtual maximum permissible top speed, which is determinable in the functional unit on the basis of the criticality of the second event (for example, curve or expressway exit having a comparatively small curve radius).

Additionally, the maximum permissible top speed can also be predefined, for example, by a traffic sign, wherein the location of the traffic sign simultaneously represents the point in time of the event.

Extraordinary Situation Function.

In one alternative or in one further advantageous embodiment of the invention, the functional unit is designed with the aid of an extraordinary situation function in such a way that the actual speed is first reduced, according to the predefined deceleration potential, at the (a third) point in time, at which, starting from the actual speed, the reduced setpoint speed is achievable as precisely as possible at the location-dependent point in time of the second event. The extraordinary situation function is activated upon identification of a first event which, starting from an actual speed, does not result in the specification of an increased setpoint speed, but rather a constant setpoint speed, possibly at a predefined location-dependent first point in time, and, upon identification of a subsequent second event which, starting from the actual speed, results in the specification of a setpoint speed that is reduced in relation thereto at a predefined location-dependent second point in time, Expanded Result Selection.

In one alternative or in one further advantageous embodiment of the invention, in the presence of a plurality of events situated one behind the other comparatively closely in a predefined observation period, the reduced setpoint speed is determinable in the functional unit in the form of an expanded event selection in such a way that only the events are selected that, starting from a present setpoint speed, which can be either the actual speed or an increased setpoint speed, result in a reduced setpoint speed. Moreover, in the expanded event selection in the predefined observation period, only the events can be selected that have a reduced setpoint speed at the particular predecessor event. Finally, in the expanded event selection in the predefined observation period, in addition, only the events can be selected that have a defined minimum distance (preferably applicable depending on the driving mode) from the particular predecessor event. Moreover, only the events are selected that are achievable with the predefined deceleration potential at the location-dependent point in time of the particular selected event. Finally, from this selection, the minimum reduced setpoint speed is selected as the reduced setpoint speed for the speed or acceleration control.

The invention is based on the following considerations.

The basic idea is the improved adaptation of the acceleration behavior in the automatic longitudinal guidance mode of a motor vehicle, in particular when, following an upcoming acceleration to a first increased setpoint speed due to a first event (for example, the driver increases the set speed of a cruise control), a reduction is necessary once more, to a second reduced setpoint speed. The longitudinal driver assistance (control) system according to the invention comprises, for this purpose, an appropriately programmed functional unit in the form of a computer program product, which can be integrated in an electronic control unit for driver assistance systems, which is known per se.

The invention is directed to a longitudinal control, which allows for an automated intervention into the target speed (for example, "Tempomat", "ACC Adaptive Cruise Control"). This automatic longitudinal control can comprise a position control (target for speed and acceleration at a location relative to the actual position). Moreover, navigation systems are known, which can transmit upcoming map attributes to the longitudinal control in the form of segments and their properties. In addition, a system is required, which can control in an automated manner with respect to events (such as curves, roundabout, turn, traffic lights, etc.) from the digital map.

A conventional forward-looking control with respect to curves, turns, speed limits, or roundabouts typically has basic dynamics, with which the vehicle accelerates after passing an event or upon activation of the system or upon exiting succession driving behind a preceding vehicle. This acceleration behavior is perceived as being too dynamic and, from a perspective of driving efficiency, implausible on a route having many events.

The longitudinal driver assistance (control) system according to the invention takes the presently available acceleration potential or deceleration potential into account and predicts, in an anticipatory manner, in particular in the case of a required deceleration up to the location of a second event to a reduced setpoint speed after a preceding acceleration to an increased setpoint speed due to a first event, whether the target speed of the longitudinal guidance system can be reached with this (negative) acceleration without the target speed being exceeded at the location of the second event with a deceleration, which is assumed to be linear. (CASE a)

If this is not the case (prediction of the acceleration and the deceleration up to the event exceed the event speed), the basic dynamics of the vehicle are reduced as a function of the distance to the second event. The vehicle therefore accelerates with reduced dynamics to the increased setpoint speed of the first event. (CASE b)

The system predicts a first acceleration scenario (the acceleration can also be zero in a special case, for example, on a section of an expressway before an intended exit) and a subsequent deceleration scenario, and can therefore predict, considerably earlier, whether the utilization of the full acceleration potential is even meaningful or necessary. As a result, on the one hand, the driving feeling becomes considerably more pleasant during many events (for example, on a curvy road) and, on the other hand, the reduction of the acceleration potential results in a more efficient driving behavior.

The upcoming events, which are also referred to as "events", can be, for example, temporary or permanent speed limits, which are either indicated directly on a traffic sign or are to be derived therefrom on the basis of the general traffic regulations (for example, a speed limit of 50 km/h when driving through a town applies in Germany). It can also be an event that triggers a speed limitation or at least an event increasing to a new top speed, which is usually the case, for example, upon exiting a locality or a roundabout or a curve.

The (second) reduced setpoint speed, which is decisive for the longitudinal driver assistance system, at the location of the upcoming second event can be either the actually predefined new speed limit or a speed deviating upward or downward from the predefined new speed limit by a predefined amount, wherein the amount and the direction of the deviation can also be adjustable, for example, by the driver in a central vehicle menu. This new (second) reduced setpoint speed can be transmitted directly from the functional unit or first ascertained on the basis of the present information in the functional unit.

In the case of certain routes, it can happen that speed limit signs are situated, in some cases, ahead of tight curves, roundabouts, or, on expressways, ahead of or in an exit. If, for example, a traffic sign of this type is identified and the change to the (second) reduced setpoint speed is anticipated (this can take place automatically or after authorization manually confirmed by the driver), the driver can experience unpleasant situations. For example, in the case of an adaptation of the permissible top speed that results in a high acceleration of the vehicle, that can be unpleasant or incomprehensible to the driver when a roundabout or a tight curve arises further ahead on the route, which should be traveled along at a slower speed, once more, for comfort or safety reasons. In addition, for example, adverse effects on the traffic behind the vehicle can also occur when an adaptation of the permissible top speed is triggered due to an identified upcoming relevant event that would result in an early slow deceleration of the vehicle, because the driver, for example, wants to exit the present road at the next exit. The object of the invention is that such decelerations of the vehicle that are out of place for the driver or the traffic behind the vehicle are triggered.

A first sub-aspect is the adaptation of the acceleration behavior in the automatic longitudinal guidance mode. A second sub-aspect is an exit strategy in the automatic longitudinal guidance mode. A third sub-aspect is the (expanded) selection of an event for the cruise control in the automated longitudinal guidance mode. All three sub-aspects relate to setpoint speed-reducing events.

The invention is explained in greater detail with reference to following exemplary embodiments.

BRIEF DESCRIPTION OF THE DRAWINGS

FIG. 2a shows a first situation according to the aforementioned case a and the resultant adaptation of the acceleration behavior, according to the invention, in the automatic longitudinal guidance mode.

FIG. 2b shows a second situation according to the aforementioned case b and the resultant adaptation of the acceleration behavior, according to the invention, in the automatic longitudinal guidance mode.

DETAILED DESCRIPTION OF THE DRAWINGS

Figure 1:
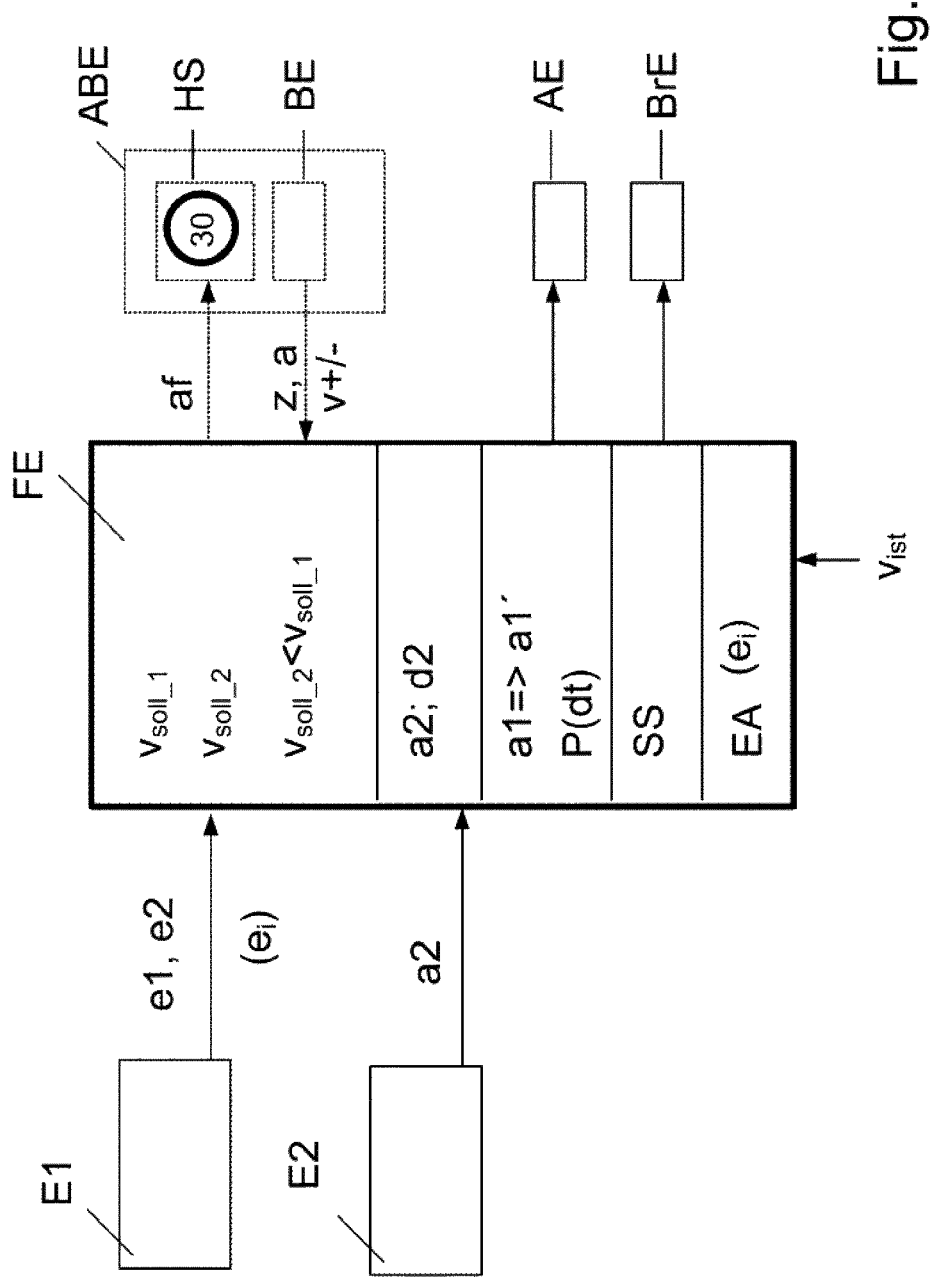
FIG. 1 shows an exemplary configuration of a longitudinal driver assistance system designed as a cruise control system in a motor vehicle for controlling the speed to a setpoint speed.

FIG. 1 schematically shows the following essential components of a longitudinal driver assistance system according to the invention:
- a first forward-looking detection system E1 for identifying a first event e1 which, starting from an actual speed $v_{ist}$, results in the specification of an increased setpoint speed $v_{soll\_1}$ at a predefined location-dependent first point in time, and for identifying a subsequent second event e2 which, starting from the increased setpoint speed $v_{soll\_1}$, results in the specification of a setpoint speed $v_{soll\_2}$ that is reduced in relation thereto at a predefined location-dependent second point in time;
- a second forward-looking detection system E2 for identifying, in an anticipatory manner, a predefined deceleration potential a2 starting from the increased setpoint speed $v_{soll\_1}$ to the reduced setpoint speed $v_{soll\_2}$;
- a functional unit FE, which reduces the acceleration to the increased setpoint speed $v_{soll\_1}$ from a1 to a1', in particular at the present point in time to and/or location do, if, otherwise, the subsequent deceleration to the reduced setpoint speed $v_{soll\_2}$ with the predefined deceleration potential a2 would not be completed at the location-dependent point in time of the second event;
- a drive unit AE and a brake unit BrE for carrying out the acceleration or speed adjustment; and
- a display operating unit ABE including a message system HS and an operating element BE, wherein the message system HS preferably displays the particular selected event.

The output signals e1 and e2 and/or $e_i$ of the detection system E1, the output signal a2 of the detection system E2, the actual speed signal $v_{ist}$, optionally an authorization signal z for authorizing an automatic speed adaptation, optionally a rejection signal a for rejecting the authorization of the automatic speed adaptation, and a signal v+/− for the manual adaptation of the setpoint speed are input signals of the functional unit FE.

The detection unit E1 is, for example, a map-based detection unit, which, on the basis of present map data, the own position, and a known upcoming route section, identifies events e1 and e2 and/or $e_i$, which require an adaptation of the setpoint speed (for example, speed limit, roundabout, expressway exit, curve radii). The map-based detection unit E1 is designed in such a way that, on the one hand, it identifies the location of the upcoming relevant event (for example, reaching a roundabout, an expressway exit, or a sharp curve), i.e., also the level of the maximum permitted setpoint speed applicable at this location, and transmits this to the functional unit FE as the location-dependent point in time d2 or t2.

Additionally, the detection unit E1 can also be camera-based, so that upcoming, speed-limiting events, which possibly require an adaptation of the setpoint speed, are also identifiable on the basis of the data of a forwardly aligned (for example, video) sensor system.

The functional unit FE can output an appropriate signal af to the driver at a defined point in time at a display operating unit ABE, which includes a message system HS and an operating element BE. Depending on the embodiment of the cruise control system, according to a first alternative, the output can be triggered, in principle, only for the case in which the ascertained new setpoint speed is less than the maximum desired setpoint speed predefined by the driver. According to a second alternative, the output can take place regardless of the maximum setpoint speed desired by the driver.

The operating element BE, with the aid of which the driver can confirm the prompt message, is designed in such a way that the driver can request a manual change of the setpoint speed v+/− at the times at which no prompt message is output, in order to specify a new set speed.

According to an alternative embodiment of the longitudinal driver assistance system, the functional unit FE could also be designed in such a way that it does not first trigger the automatic adaptation of the speed after receipt of an authorization confirmation z, but rather automatically upon reaching the ascertained defined point in time. In an embodiment of this type, the display operating unit ABE represented using dotted lines could be dispensed with.

On the basis of FIG. 2a and FIG. 2b, the adaptation of the acceleration behavior in the automatic longitudinal guidance mode (see also above, case a and case b) according to the invention—which can be carried out in the functional unit FE with the aid of an appropriate computer program product—is represented by the profiles of the vehicle speed v plotted with respect to the location d and the time t.

FIG. 2a and FIG. 2b show a route d with respect to the time t, wherein at the location do and/or at the point in time to, a first event e1 is identified here in the form of a new set speed specification of 80 km/h which, looking ahead, would be reached at the location d1 and/or at the point in time t1 starting from the actual speed $v_{ist}$ of 40 km/h with a present acceleration behavior a1 (which is not yet according to the invention). Likewise looking ahead, a second event e2 having a reduced setpoint speed $v_{soll\_2}$ of 50 km/h is identified at the location d2 and/or at the point in time t2.

In FIG. 2a, the aforementioned "case a" is shown. The acceleration behavior a1 does not need to be adapted, since the reduced setpoint speed $v_{soll\_2}$ is achievable with the deceleration potential a2, which has also been identified, at the location d2 and/or the point in time t2 starting from the increased setpoint speed $v_{soll\_1}$ at the location d1 and/or the point in time t1.

In FIG. 2b, the aforementioned "case b" is shown. The acceleration behavior a1 must be adapted into a reduced acceleration behavior a', since the reduced setpoint speed $v_{soll\_2}$ would otherwise not be achievable with the identified deceleration potential a2 at the location d2 and/or the point in time t2 starting from the increased setpoint speed $v_{soll\_1}$ at the location d1 and/or the point in time t1.

The reduced acceleration a1' to the increased setpoint speed $v_{soll\_1}$ is preferably carried out on the basis of an empirically ascertained tabular specification, for example, characteristic curve P(dt), depending on a predefined location-based time interval dt from the point in time to (and/or from the point in time t1) up to the point in time t2 of the second event e2, which is associated here with a simultaneous change to the reduced setpoint speed $v_{soll\_2}$.

Figure 3:
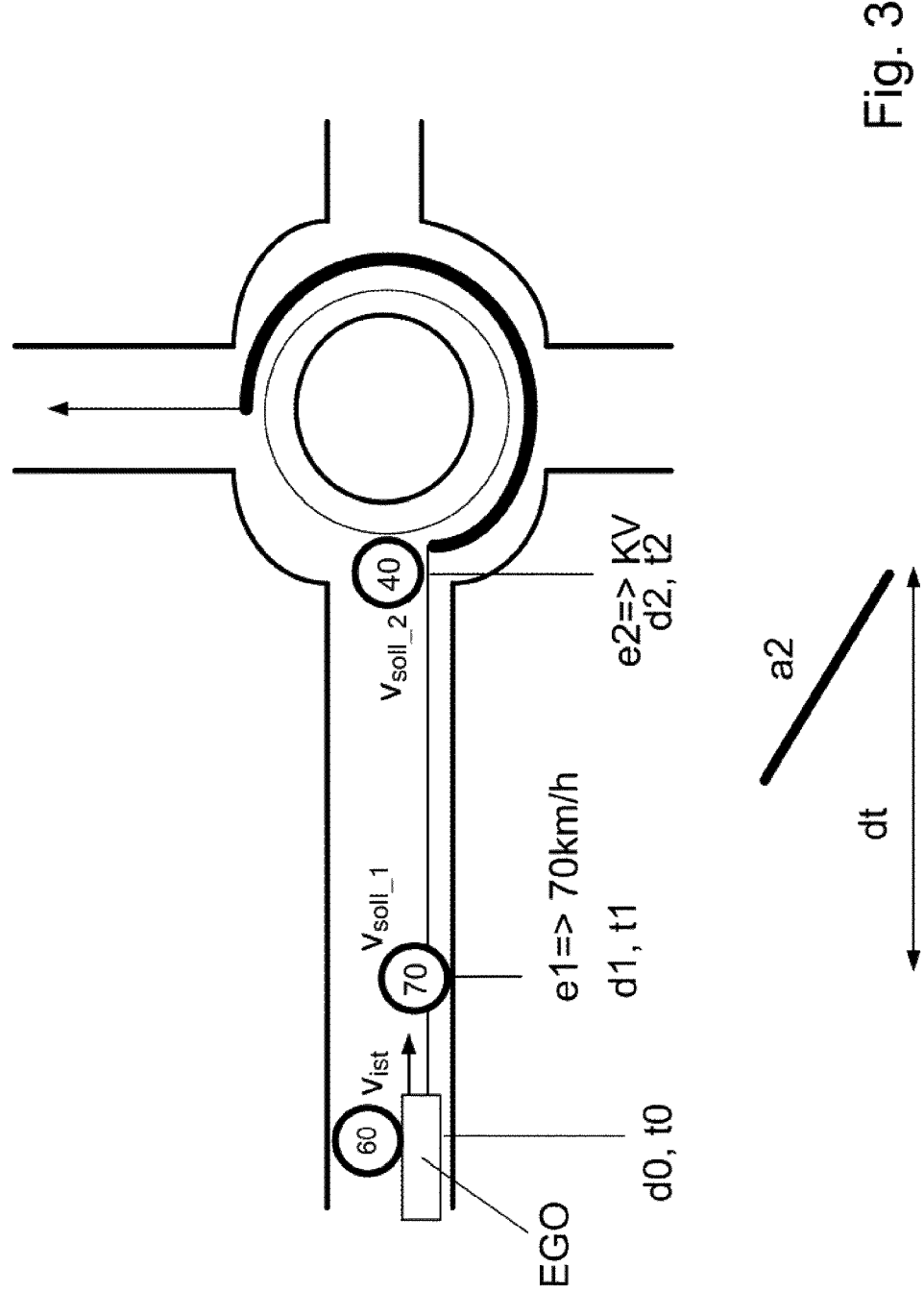
FIG. 3 shows a first specific traffic situation including a roundabout, in which the embodiment of the longitudinal driver assistance system according to the invention is advantageous.

FIG. 3 shows a traffic situation, in which, at the point in time to and/or at the location do, a vehicle EGO equipped with an exemplary system according to the invention moves toward a roundabout KV at an actual speed of, for example, 60 km/h due to an active cruise control. At the point in time t1 and/or at the location d1, a first event e1 in the form of a traffic sign is identifiable, due to which an increased setpoint speed $v_{soll\_1}$ is permissible and is automatically adjustable by the system according to FIG. 2a.

The second event e2 relates, in this case, to the merging into a roundabout KV at the point in time t2 and/or at the location d2. The reduced setpoint speed $v_{soll\_2}$, in this case, is a virtual maximum permissible top speed, which is determinable by the functional unit FE on the basis of the criticality of the second event e2 and the circular travel. Due to the radius of the roundabout KV, the roundabout KV is to be traveled through at a recommended speed $v_{soll\_2}$ of a maximum of 40 km/h.

The acceleration behavior a1 does not need to be adapted in this case, since the reduced setpoint speed $v_{soll\_2}$ is achievable with the deceleration potential a2, which has also been identified, at the location d2 and/or the point in time t2 starting from the increased setpoint speed $v_{soll\_1}$ at the location d1 and/or the point in time t1. Preferably, an acceleration could also be suppressed in this case if the time between to and t1 is so short that the increased setpoint speed is not achievable at the point in time t1.

Figure 4:
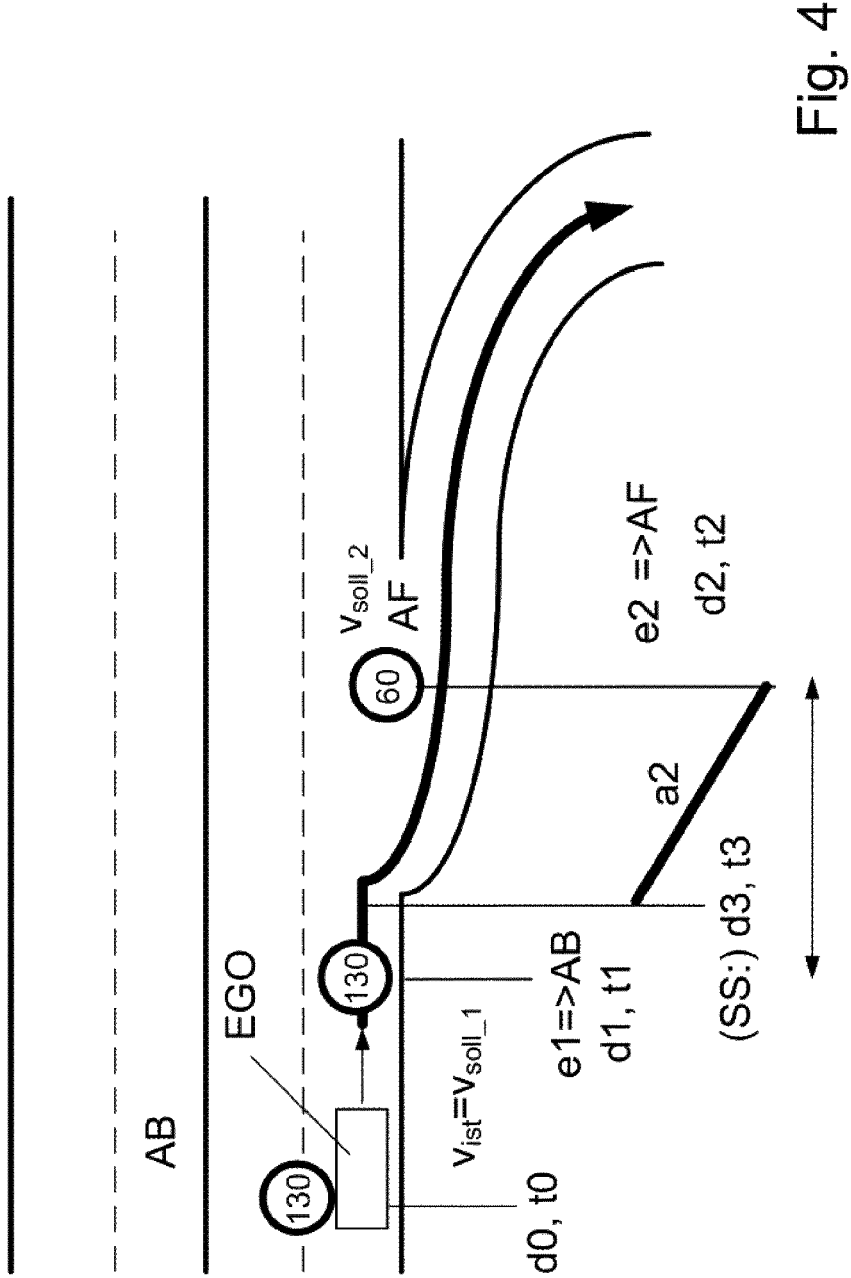
FIG. 4 shows a second specific traffic situation including an expressway exit, in which the embodiment of the longitudinal driver assistance system according to the invention is advantageous, in particular, also with a specific exit strategy in the automatic longitudinal guidance mode.

FIG. 4 shows a traffic situation, in which a vehicle EGO equipped with an exemplary system according to the invention travels on an expressway AB at a speed $v_{ist}=v_{soll\_1}$ of, for example, 130 km/h, due to the active cruise control. At the point in time t1 and/or at the location d1, an event e1 is identified, according to which the vehicle EGO on the expressway AB is located at a close distance from the exit AF, wherein the setpoint speed $v_{ist}=v_{soll\_1}$ is not changed.

On the basis of the activated route guidance, it is known that the vehicle will exit the expressway AB at the next exit AF with a comparatively sharp curve radius. Either a speed limit sign, for example, for 60 km/h is located at the point in time t2 and/or at the location d2 of the beginning of the exit, or this speed is predefined as a reduced setpoint speed due to the criticality. This speed limit corresponds to an event e2.

In order to prevent the vehicle EGO from already decelerating too soon on the expressway AB and, therefore, also prompting the traffic behind the vehicle to decelerate the speed, an extraordinary situation function SS is activated in the functional unit FE. This first reduces the actual speed $v_{soll\_1}=v_{ist}$ at the point in time t3 and/or at the location d3 according to the predefined deceleration potential a2, at which, starting from the actual speed $v_{ist}=v_{soll\_1}$, the reduced setpoint speed $v_{soll\_2}$ is achievable at the location-dependent point in time d2 and/or t2 of the second event e2.

The extraordinary situation function SS is therefore activated upon identification of a first event e1 which, starting from an actual speed $v_{ist}$, does not result in the specification of an increased setpoint speed $v_{soll\_1}=v_{ist}$, but rather a constant setpoint speed $v_{soll\_1}=v_{ist}$, at a predefined location-dependent first point in time d1 and/or t1, and, upon identification of a subsequent second event e2 which, starting from the actual speed $v_{soll\_1}=v_{ist}$, results in the specification of a setpoint speed $v_{soll\_2}$ that is reduced in relation thereto at a predefined location-dependent second point in time d2 and/or t2. Similarly, the event e1 can also be dispensed with in this extraordinary situation function SS.

The refinements according to the invention as represented in FIG. 4 (extraordinary situation function) are based on the following fundamental considerations.

A conventional forward-looking control with respect to curves, turns, speed limits, or roundabouts typically has a very comfortable and early beginning of the control. This is inappropriate in an exit situation, since the traffic behind the vehicle could be (greatly) impeded. In general, exits on expressways or expressway-like roads, which generally comprise a deceleration lane, are approached, in the manual longitudinal guidance mode of these deceleration lanes, at considerably increased speeds and, thereupon, deceleration takes place. These increased dynamics with respect to exit situations are not represented in the present-day related art and are perceived as impeding traffic flow.

According to the invention, during an approach to an expressway exit, the control with respect to events located after the deceleration lane is therefore initially prevented. Instead, for the beginning of the deceleration lane, an applicable exit speed is stored as a (virtual) reduced setpoint speed and deceleration to this exit speed takes place with the aid of an applicable exceptional situation function. If the beginning of the deceleration lane has been reached, the subsequent events are once again permitted with respect to control. An exception is the case when the deceleration to a subsequent event exceeds the applicable exit deceleration to a considerable extent in terms of amount. In this case, deceleration with respect to the event is permitted to take place before the deceleration lane has been reached. A dynamic pre-control with respect to the deceleration lane is carried out only when an event is located within a certain time interval after the end of the deceleration lane, the target speed of which is below the exit speed.

As a result, a more dynamic driving operation on expressways or expressway-like roads including deceleration lanes is achieved, which is adapted to the driving behavior of the remaining road users. The automatic longitudinal guidance mode must be overridden, in order not to impede the traffic flow, to a considerably lesser extent.

Figure 5:
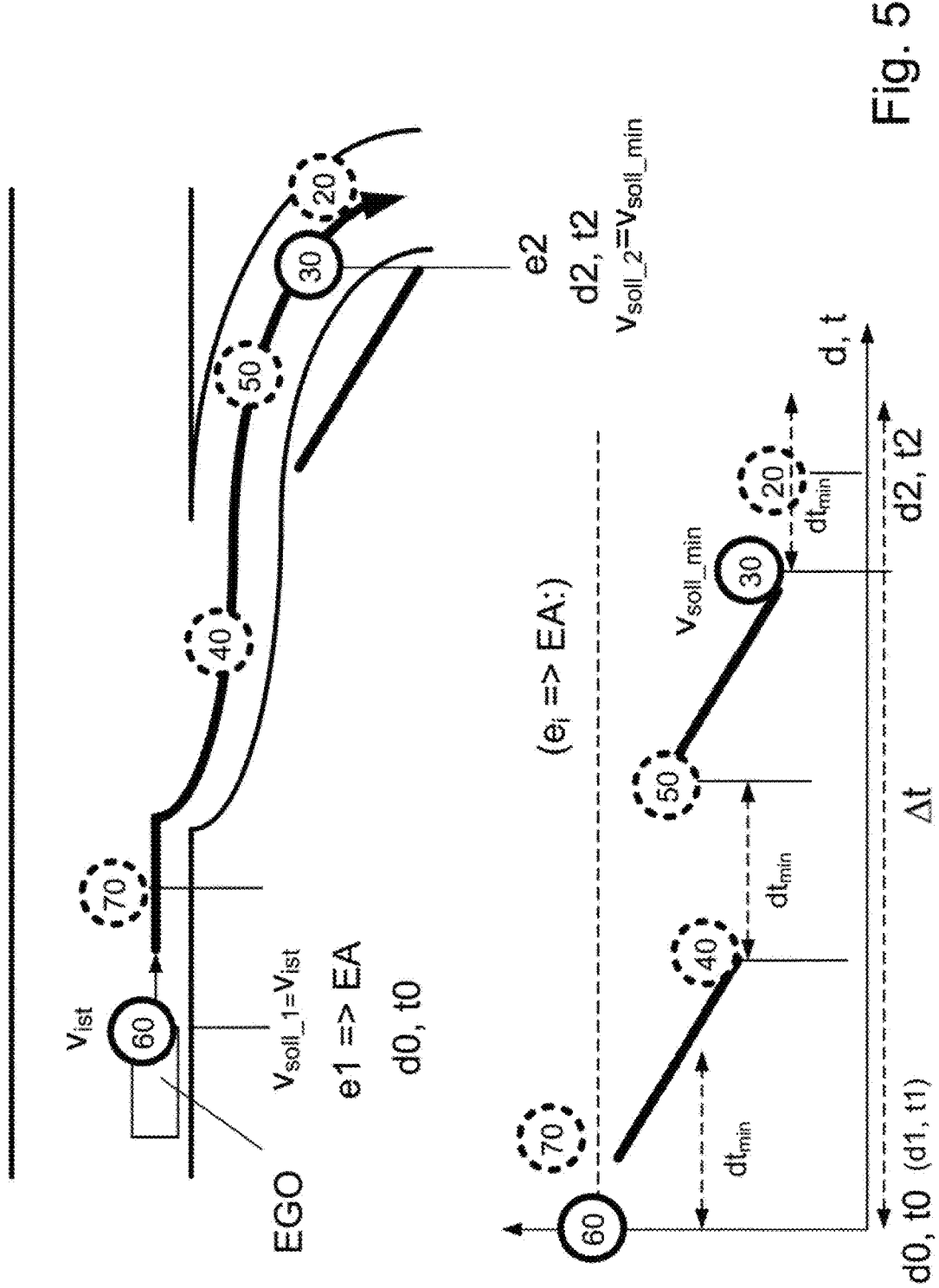
FIG. 5 shows a third specific traffic situation including an extremely curvy road routing, in which the embodiment of the longitudinal driver assistance system according to the invention is advantageous, in particular, also with a specific expanded event selection in the automatic longitudinal guidance mode.

In FIG. 5, the mode of operation of an expanded event selection EA in the functional unit FE is explained, whereby, in the presence of a plurality of events $e_i$ situated one behind the other comparatively closely in a predefined observation period $\Delta t$, the reduced setpoint speed $v_{soll\_2}$ is determinable in the functional unit in the form of an expanded event selection in such a way that only the events are selected that, starting from a present setpoint speed, which can be either the actual speed $v_{ist}$ or an increased setpoint speed $v_{soll\_1}$, result in a reduced setpoint speed. The expanded event selection EA can be applied both in the presence or not in the presence of an anticipated setpoint speed-increasing event e1.

In the expanded event selection EA, preferably, in addition, in the predefined observation period $\Delta t$, only the events are selected that have a reduced setpoint speed at the particular predecessor event $e_{i-1}$.

Moreover, in the expanded event selection EA in the predefined observation period $\Delta t$, preferably only the events are selected that have a defined minimum distance $dt_{min}$ (preferably applicable depending on the driving mode) from the particular predecessor event $e_{i-1}$.

In addition, all events $e_i$ must be reachable one after the other with the predefined deceleration potential a2 at the location-dependent point in time of the particular event. If this is not the case, the predecessor event is deselected.

Preferably—in particular also upon a display of a selected event in the message system HS of the display operating unit ABE—the event is deselected, the successor event of which is located within a very short applicable minimum display time interval, in order not to confuse the driver.

Finally, the event is preferably selected and, possibly, displayed on the message system HS, which is the event with the resultant minimum reduced setpoint speed $v_{soll\_2} = v_{soll\_min}$.

In FIG. 5, the aforementioned rules yield, for example, the minimum reduced setpoint speed $v_{soll\_2} = v_{soll\_min}$, for example 30 km/h, toward which control is subsequently carried out. The deselected examples are represented with the aid of dashed lines. The possible setpoint speed of 70 km/h is omitted, because it is higher than the actual speed of 60 km/h. The possible setpoint speed of 50 km/h is omitted, because it is higher than the reduced setpoint speed of 40 km/h. The possible setpoint speed of 20 km/h is omitted, because it or its associated event is situated within the minimum distance $dt_{min}$ from the predecessor event with the setpoint speed of 30 km/h. The predefined deceleration potential a2 suffices to reach the setpoint speeds of the event e2 selected in this case in a timely manner.

The refinements according to the invention as represented in FIG. 5 (expanded event selection) are based on the following fundamental considerations:

If multiple events are situated closely one behind the other on a road course, these are represented to the driver sequentially in the form of a superimposition of alerts and are adjusted one after the other. This results in rapidly changing superimpositions of alerts, which can confuse the driver. An appropriate control would result in a turbulent driving behavior.

The selected event, which has been expanded according to the invention, allows for a message display related to an event, which is understood by the driver as being plausible, and a calming of the message display that is represented to the driver. Confusion does not arise and more confidence in the automatic longitudinal guidance system is suggested to the driver. Moreover, independence from the message display and the event control is achieved.

Finally, for the sake of completeness, it is to be mentioned that the longitudinal driver assistance system according to the invention can be utilized not only for cruise control systems, but also for other types of assistance for the driver with respect to longitudinal guidance. For example, the longitudinal driver assistance system can also be designed, for example, as a speed limiting system, in the case of which a maximum permissible limiting speed is predefinable, and the functional unit is configured for preventing the predefined or set maximum permissible speed from being exceeded due to an appropriate actuation of the drive.

What is claimed is:

1. A longitudinal driver assistance system in a motor vehicle, comprising:
a first detection system comprising one or more of:
a navigation system configured to obtain map data specifying a location of an event and a setpoint speed applicable at the location; or
a camera configured to obtain image data identifying the event, wherein the first detection system is configured to:
identify a first event specifying an increased setpoint speed from an actual speed of the motor vehicle that would be reached at a predefined location-dependent first point in time by applying an acceleration, and
identify a subsequent second event specifying a reduced setpoint speed that is reduced in relation to the increased setpoint speed at a predefined location-dependent second point in time;
a second detection system configured to:
identify, in an anticipatory manner, a predefined deceleration from the increased setpoint speed to the reduced setpoint speed; and
an electronic control unit configured to reduce the acceleration to the increased setpoint speed by communicating with a wheel brake and/or a drive motor of the motor vehicle in response to a determination that deceleration to the reduced setpoint speed cannot be completed at the predefined location-dependent second point in time without exceeding the predefined deceleration wherein
when a plurality of consecutive events in a predefined observation period are present, the electronic control unit is further configured to:
determine the reduced setpoint speed via an expanded event selection such that, starting from the actual speed or a present setpoint speed, one or more events are selected from the plurality of consecutive events only if the event;
reduces the actual speed or the present setpoint speed,
reduces the actual speed or the present setpoint speed at a predecessor event,
has a defined minimum distance from the predecessor event, and/or is achievable with the predefined deceleration at a location-dependent point in time of the one or more selected events, wherein,
from the expanded event selection, a minimum reduced setpoint speed is selected as the reduced setpoint speed.

2. The longitudinal driver assistance system according to claim 1, wherein
the electronic control unit is further configured to reduce the acceleration to the increased setpoint speed based on an empirically ascertained tabular specification depending on a predefined location-based time interval to the subsequent second event.

3. The longitudinal driver assistance system according to claim 1, wherein
the increased setpoint speed is predefined by a driver and specified in the first event.

4. The longitudinal driver assistance system according to claim 1, wherein
the reduced setpoint speed is a maximum permissible top speed and specified in the subsequent second event.

5. The longitudinal driver assistance system according to claim 1, wherein
the subsequent second event is a maximum permissible top speed for merging into a roundabout, for exiting an exit ramp, and/or for negotiating at least one curve having a previously determined curve radius.

6. The longitudinal driver assistance system according to claim 1, wherein
the reduced setpoint speed is a virtual maximum permissible top speed, which is determinable in the electronic control unit based on a criticality of the subsequent second event.

7. The longitudinal driver assistance system according to claim 1, wherein
the increased setpoint speed is a first increased setpoint speed;
the reduced setpoint speed is a first reduced setpoint speed;
the electronic control unit contains an extraordinary situation function, which is activatable:
first, upon identification of a third event which, starting from the actual speed, does not specify a second increased setpoint speed, but rather a constant setpoint speed, at a predefined location-dependent third point in time, and
second, upon identification of a subsequent fourth event which, starting from the actual speed, specifies a second reduced setpoint speed that is reduced in relation to the constant setpoint speed at a predefined location-dependent fourth point in time, and
the extraordinary situation function is designed such that the actual speed is reduced, according to the predefined deceleration at a fifth point in time such that, starting from the actual speed, the second reduced setpoint speed is achievable at the location-dependent fourth point in time.

8. A longitudinal driver assistance system in a motor vehicle, comprising:
a first detection system comprising one or more of:
a navigation system configured to obtain map data specifying a location of an event and a setpoint speed applicable at the location; or
a camera configured to obtain image data identifying the event, wherein the first detection system is configured to:
identify a first event specifying an increased setpoint speed from an actual speed of the motor vehicle that would be reached at a predefined location-dependent first point in time by applying an acceleration, and
identify a subsequent second event specifying a reduced setpoint speed that is reduced in relation to the increased setpoint speed at a predefined location-dependent second point in time;
an electronic control unit configured to reduce the acceleration to the increased setpoint speed, wherein
when a plurality of consecutive events in a predefined observation period are present, the electronic control unit is further configured to:
determine the reduced setpoint speed via an expanded event selection such that, starting from the actual speed or a present setpoint speed, one or more events are selected from the plurality of consecutive events only if the event:
reduces the actual speed or the present setpoint speed,
reduces the actual speed or the present setpoint speed at a predecessor event,
has a defined minimum distance from the predecessor event, and/or
is achievable with a predefined deceleration from the increased setpoint speed to the reduced setpoint speed at a location-dependent point in time of the one or more selected events.

9. The longitudinal driver assistance system according to claim 8, wherein
the electronic control unit is further configured to reduce the acceleration to the increased setpoint speed based on an empirically ascertained tabular specification depending on a predefined location-based time interval to the subsequent second event.

10. The longitudinal driver assistance system according to claim 8, wherein the increased setpoint speed is predefined by a driver and specified in the first event.

11. The longitudinal driver assistance system according to claim 8, wherein
the reduced setpoint speed is a maximum permissible top speed and specified in the subsequent second event.

12. The longitudinal driver assistance system according to claim 8, wherein
the subsequent second event is a maximum permissible top speed for merging into a roundabout, for exiting an exit ramp, and/or for negotiating at least one curve having a previously determined curve radius.

13. The longitudinal driver assistance system according to claim 8, wherein
the reduced setpoint speed is a virtual maximum permissible top speed, which is determinable in the electronic control unit based on a criticality of the subsequent second event.

14. A longitudinal driver assistance system in a motor vehicle, comprising:
a first detection system comprising one or more of:
a navigation system configured to obtain map data specifying a location of an event and a setpoint speed applicable at the location; or
a camera configured to obtain image data identifying the event, wherein the first detection system is configured to:
identify a first event specifying an increased setpoint speed from an actual speed of the motor vehicle that would be reached at a predefined location-dependent first point in time by applying an acceleration, and identify a subsequent second event specifying a reduced setpoint speed that is reduced in relation to the increased setpoint speed at a predefined location-dependent second point in time;

an electronic control unit configured to reduce the acceleration to the increased setpoint speed, wherein the electronic control unit is further configured to:

determine the reduced setpoint speed via an expanded event selection such that, starting from the actual speed or a present setpoint speed, one or more events are selected from a plurality of consecutive events only if the event:

reduces the actual speed or the present setpoint speed at a predecessor event, has a defined minimum distance from the predecessor event, and is achievable with a predefined deceleration from the increased setpoint speed to the reduced setpoint speed at a location-dependent point in time of the one or more selected events.

15. The longitudinal driver assistance system according to claim 14, wherein the electronic control unit is further configured to reduce the acceleration to the increased setpoint speed based on an empirically ascertained tabular specification depending on a predefined location-based time interval to the subsequent second event.

16. The longitudinal driver assistance system according to claim 14, wherein the increased setpoint speed is predefined by a driver and specified in the first event.

17. The longitudinal driver assistance system according to claim 14, wherein the reduced setpoint speed is a maximum permissible top speed and specified in the subsequent second event.

18. The longitudinal driver assistance system according to claim 14, wherein the subsequent second event is a maximum permissible top speed for merging into a roundabout, for exiting an exit ramp, and/or for negotiating at least one curve having a previously determined curve radius.

19. The longitudinal driver assistance system according to claim 14, wherein the reduced setpoint speed is a virtual maximum permissible top speed, which is determinable in the electronic control unit based on a criticality of the subsequent second event.

* * * * *